United States Patent [19]

Hiroshima et al.

[11] Patent Number: 5,727,048
[45] Date of Patent: Mar. 10, 1998

[54] MULTIMEDIA COMMUNICATION SYSTEM WITH A MULTIMEDIA SERVER TO TERMINALS VIA A PUBLIC NETWORK

[75] Inventors: Shuuichi Hiroshima; Ayako Katsuyama; Kenichi Ohzasa; Hajime Kamata; Masayuki Ozawa, all of Kawasaki, Japan

[73] Assignee: Fujitsu Limited, Kanagawa, Japan

[21] Appl. No.: 563,464

[22] Filed: Nov. 28, 1995

[30] Foreign Application Priority Data

Mar. 1, 1995 [JP] Japan ................... 7-041631

[51] Int. Cl.⁶ ...................................... H04M 11/00
[52] U.S. Cl. .................... 379/93.12; 379/93.25; 379/100.11; 379/93.17; 395/226; 395/227
[58] Field of Search ................... 395/226, 227; 379/90, 93, 96, 98, 92, 91, 100, 201, 209, 355, 133, 90.01, 93.01, 93.02, 93.12, 93.17, 93.23, 106.01, 100.11, 93.25; 386/75

[56] References Cited

U.S. PATENT DOCUMENTS

| | | | |
|---|---|---|---|
| 4,757,267 | 7/1988 | Riskin | 379/201 |
| 4,860,123 | 8/1989 | McCalley et al. | 386/75 |
| 4,933,968 | 6/1990 | Iggulden | 379/355 |
| 4,972,318 | 11/1990 | Brown et al. | 395/226 |
| 4,992,940 | 2/1991 | Dworkin | 395/226 |
| 5,146,489 | 9/1992 | Telibasa | 379/100 |
| 5,319,542 | 6/1994 | King, Jr. et al. | 395/227 |
| 5,341,222 | 8/1994 | Newman et al. | 379/100 |
| 5,479,500 | 12/1995 | Matsuzaki et al. | 379/209 |
| 5,590,180 | 12/1996 | Tonomura et al. | 379/133 |

FOREIGN PATENT DOCUMENTS

| | | |
|---|---|---|
| 1293063 | 11/1989 | Japan . |
| 382255 | 4/1991 | Japan . |
| 5308438 | 11/1993 | Japan . |

*Primary Examiner*—Curtis Kuntz
*Assistant Examiner*—Stephen Wolff Palan
*Attorney, Agent, or Firm*—Helfgott & Karas, P.C.

[57] ABSTRACT

A multimedia communication system which allows a user at a terminal to efficiently place an order for merchandise with a merchandise provider includes terminals and a multimedia server connected thereto via a public network. The multimedia server includes an information storage unit for storing multimedia information on each merchandise item, a communication control unit for controlling information transmission between terminals and the server via the public network, and a bulletin board service unit for transmitting merchandise items from the information storage unit to the communication control unit in response to a merchandise information look-up request from any of terminals. The multimedia server further has an ordering service unit and a main service unit. The ordering service unit enters the quantities and delivery times of merchandise ordered from a terminal into a received order master file, transcribes what is input in the master file onto a slip, and enters the slip into a received order file after adding to the slip the address, name and user code number of the user who placed the order. The mail service unit transmits slips held in the ordering service unit to the terminal of a merchandise delivery center via the communication control unit.

7 Claims, 10 Drawing Sheets

MULTIMEDIA COMMUNICATION SYSTEM WITH A MULTIMEDIA SERVER TO TERMINALS VIA A PUBLIC NETWORK

BACKGROUND OF THE INVENTION

1. Field of the Invention

The present invention relates to a multimedia communication system.

2. Description of the Related Art

The multimedia communication system of this invention involves connecting a multimedia server in a host computer to terminals such as personal computers via a public network. On the public network, the multimedia server supplies any of the terminals with multimedia information such as photographs, text, voice and images when so ordered.

When ordering merchandise by telephone or by facsimile terminal (called the fax terminal hereunder), users of conventional multimedia communication systems typically look up previously mailed pamphlets and like material, call up a center where the relevant multimedia server is installed, and place the order using push-button signals or an OMR sheet in response to voice instructions from a center operator. Alternatively, the user at a display-telephone terminal linked up with the center refers to a displayed merchandise item list in menu format, and enters an order menu of the desired merchandise together with necessary quantities thereof.

With the above type of conventional systems, when any terminal links up with the center for ordering through on-line search, the time for maintaining connection with the center tends to be prolonged and result in high communication fees. On the center's side, to provide users with ordering information requires that pamphlets, sales promotion videotapes and other marketing material be mailed to them in advance. The mailing procedures take time and money while keeping the users from obtaining the latest information in real time.

In addition, when a user with a push-phone terminal wants to utilize the same service regularly, the same operations need to be carried out repeatedly on the terminal which, at present, has yet to offer concurrent and advance command input ranging from a telephone number to a service code. The input operations impose time-consuming chores on the user. In another case, a user's fax terminal with a redialing function calling up the center may link up not with one of its fax terminals but with a telephone terminal. With the connection established, the user's fax terminal recognizes the other party's inability to communicate therewith and disconnects the line. The redial-and-disconnect operation is repeated until a predetermined redial count on the fax terminal expires. The unnecessary attempts to link up are a waste of time and communication fees.

SUMMARY OF THE INVENTION

It is therefore an object of the present invention to provide a multimedia communication system allowing users at their terminals to order merchandise efficiently and permitting merchandise providers to deliver the ordered merchandise efficiently.

In accordance with an aspect of the present invention, there is provided a multimedia communication system comprising: terminals; a multimedia server for sending to each of the terminals, when called up thereby, multimedia information including photographs, text, voice and images regarding merchandise; and a public network for connecting the terminals to the multimedia server. The multimedia server includes: information storage means for storing multimedia information on each of merchandise items; communication control means for controlling the transmission of information between the multimedia server and the terminals via the public network; bulletin board service means for transmitting the merchandise items from the information storage means to the communication control means upon request for a merchandise information look-up by any of the terminals, the bulletin board service means further transmitting multimedia information from the information storage means to the communication control means in response to a detailed merchandise information request entered by a user through any of the terminals; ordering service means for receiving via the communication control means the quantities and delivery times of merchandise ordered by a user through any of the terminals and for entering what is ordered into a received order master file while transcribing the received quantities and delivery times of merchandise from the received order master file onto a slip, the ordering service means further entering the slip into a received order file after adding to the slip the address, name and user code number of the user who placed the order; and mail service means for transmitting slips held in the ordering service means to the terminal of a merchandise delivery center via the communication control means.

The multimedia communication system of the above constitution connects users at their terminals to the multimedia server via the public network. The system allows the users to obtain in real time photographs, text, voice and images regarding merchandise for ordering purposes, thereby eliminating the need for the multimedia server to mail the merchandise information such as pamphlets to the users. An information provider having a multimedia server installed at its site can provide information in response to specific orders without mailing beforehand to would-be buyers merchandise information such as sales promotion videotapes. All this amounts to appreciable savings of the time and fees associated with mailing.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
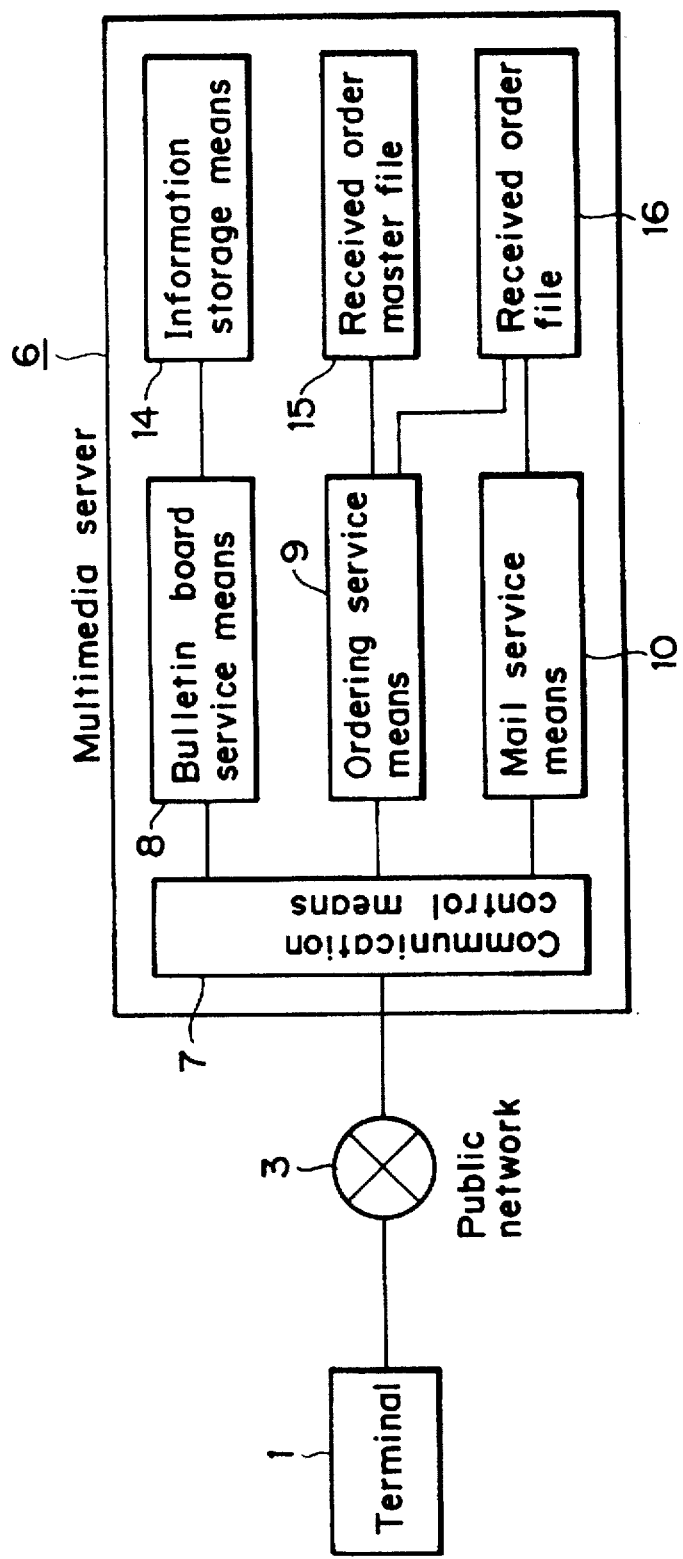
FIG. 1 is a block diagram illustrating the operating principle of this invention.

FIG. 1 is a block diagram illustrating the operating principle of this invention. In FIG. 1, reference numeral 1 represents a terminal used by a user for placing orders. The terminal may be any one of a fax terminal, a video display terminal and a telephone set, or any combination of these machines. Reference numeral 6 denotes a multimedia server installed at the site of a merchandise information provider connected to the terminal 1 via a public network 3. The multimedia server 6 provides any of the terminals 1 with multimedia information including photographs, text, voice and images about the merchandise ordered by the user at that terminal 1.

What characterizes this invention is the following constitution of the multimedia server 6: In the multimedia server 6, information storage means 14 stores multimedia information on each of available merchandise items. Communication control means 7 controls the transmission of information between the multimedia server 6 and the terminal 1 via the public network. Bulletin board service means 8 transfers the merchandise items from the information storage means 14 to the communication control means 7 in response to a merchandise information look-up request from the terminal 1. Furthermore, the bulletin board service means 8 sends multimedia information from the information storage means 14 to the communication control means 7 in response to a detailed merchandise information request by a user having looked up the merchandise items from the terminal 1.

Ordering service means 9 receives via the communication control means 7 the quantities and delivery times of merchandise ordered via the terminal 1, enters what is ordered into a received order master file 15, transcribes the quantities and delivery times of merchandise from the master file 15 onto a slip, and enters the slip into a received order file 16 after adding to the slip the address, name and user code number of the user who placed the order. Mail service means 10 transmits slips held in the ordering service means 9 to the terminal of a merchandise delivery center via the communication control means 7.

When a user of this inventive system wishes to look up information about desired merchandise, the user first enters a merchandise information look-up request through the terminal 1 to get the request transmitted to the multimedia server 6. The merchandise information look-up request is received by the bulletin board service means 8 via the communication control means 7. In response, the bulletin board service means 8 reads the merchandise items from the information storage means 14 and sends them to the terminal 1 via the communication control means 7. Examining the merchandise items thus transmitted, the user issues a detailed merchandise information request on the desired merchandise via the terminal 1. The request is sent to the multimedia server 6. Upon receipt of the detailed information request on specific merchandise, the bulletin board service means 8 accordingly retrieves the relevant multimedia information from the information storage means 14. The retrieved multimedia information is sent to the terminal 1 via the communication control means 7.

The multimedia information including photographs, text, voice and images regarding the merchandise in question appears on a display of the terminal 1. At this point, the user places an order for the merchandise with the center, the order being composed of the quantities and delivery times of the merchandise. Concurrently the user enters his or her address, name and user code number. The ordering service means 9 receives the ordered quantities and delivery times of merchandise via the communication control means 7, stores what is received into the received order master file 15, transcribes the stored quantities and delivery times from the master file 15 onto a slip, and enters the slip into the received order file 16 after adding to the slip the address, name and user code number of the user who placed the order. The slip is retrieved from the received order file 16 by the mail service means 10 and transmitted to the terminal of the merchandise delivery center via the communication control means 7.

By accessing the multimedia server 6 from the terminal 1 via the public network 3, the user acquires information about desired merchandise including photographs, text, voice and images in real time and may place an order with the server if desired. There is no need for the multimedia server 6 to mail merchandise information such as pamphlets to the user. An information provider having a multimedia server 6 installed at its site provides information in response to specific orders without mailing beforehand to users merchandise information such as sales promotion videotapes. These features combine to eliminate the time and fees traditionally associated with mailing.

Figure 2:
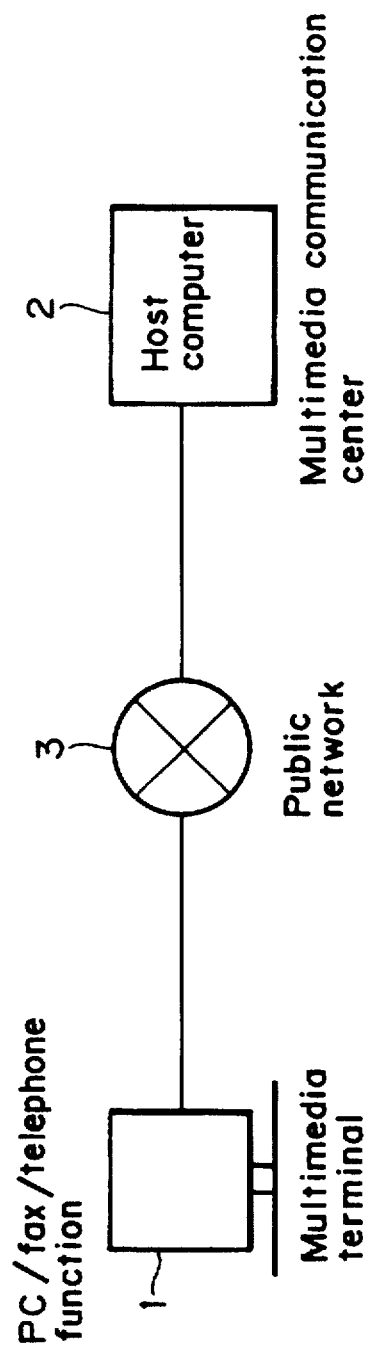
FIG. 2 is a schematic view showing the constitution of the inventive multimedia communication system.
Figure 3:
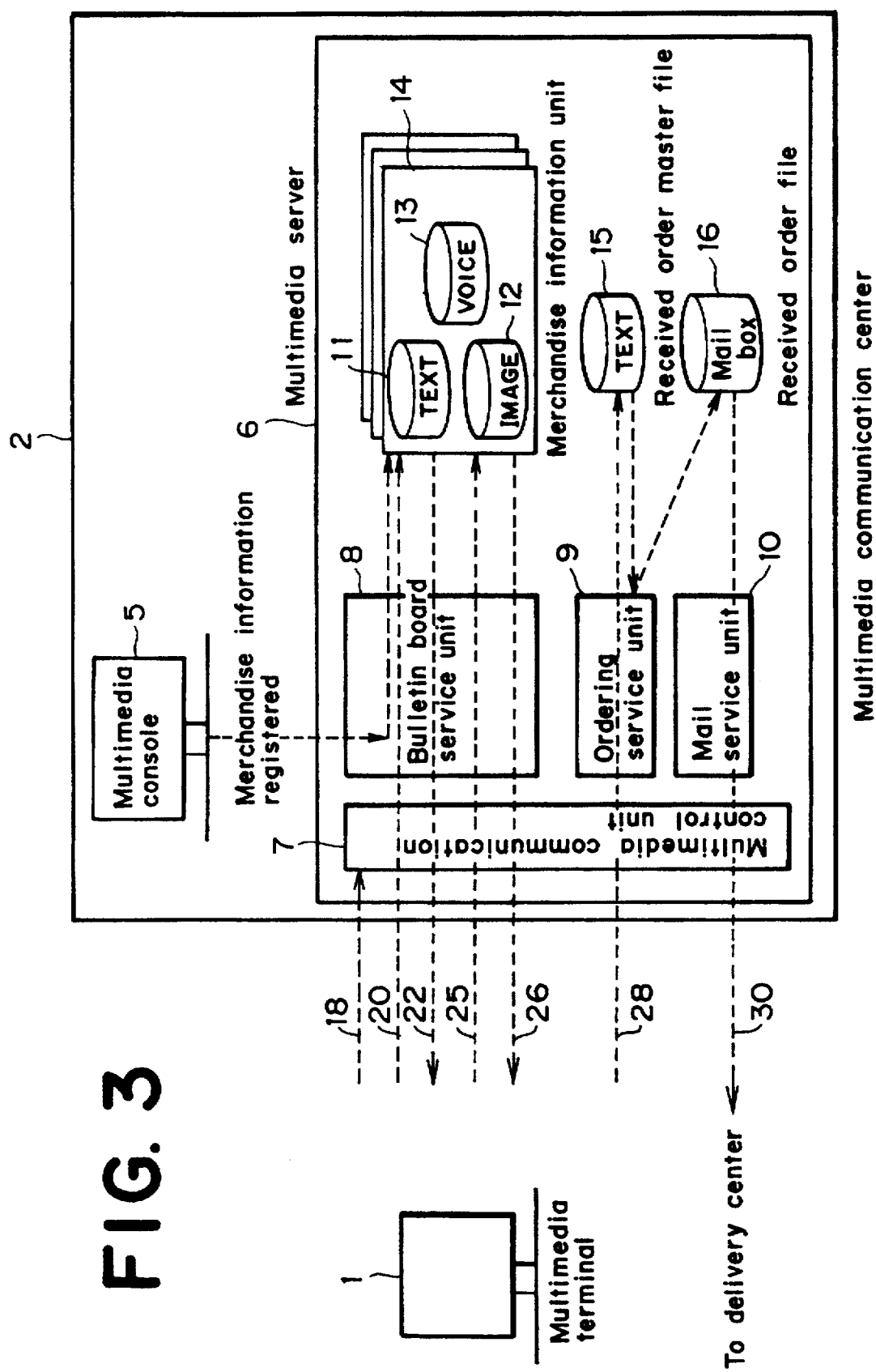
FIG. 3 is a schematic block diagram of a multimedia communication system practiced as a first embodiment of the invention.

FIG. 2 is a schematic view outlining the constitution of a multimedia communication system practiced as the first embodiment of the invention. FIG. 3 is a schematic block diagram of a multimedia server made up of a host computer of the multimedia communication system in FIG. 2. Of the parts in FIGS. 2 and 3, those already shown in FIG. 1 are designated by like reference numerals. In FIG. 2, reference numeral 1 represents a multimedia terminal such as a fax terminal, a video display terminal or a telephone set, or any combination of these machines. Reference numeral 2 denotes a host computer installed at the site of a multimedia communication center acting as a merchandise provider. Reference numeral 3 is a public network that connects the multimedia terminal 1 to the host computer 2.

As illustrated in FIG. 3, the host computer 2 comprises a multimedia console 5 and a multimedia server 6. The multimedia server 6 includes: a multimedia communication control unit 7; a bulletin board service unit 8; an ordering service unit 9; a mail service unit 10; a merchandise information unit 14 accommodating text information 11, image information 12 and voice information 13; a received order master file 15; and received order file (mail box) 16.

The multimedia communication control unit 7 controls the transmission of information between the multimedia terminal 1 and the multimedia server 6, and allows media to be switched on the same call during communication. The bulletin board service unit 8 has two functions. One function accesses merchandise information in the merchandise information unit 14 and sends the retrieved information to the multimedia communication control unit 7 so that a user may look up the merchandise information through the multimedia terminal 1. The other function of the bulletin board service unit 8 transmits merchandise information from the multimedia console 5 to the merchandise information unit 14.

The ordering service unit 9 also has two functions. One function writes to the received order master file 15 the order data entered through the multimedia terminal 1. The other function of the ordering service unit 9 transcribes the order data onto a slip (in horizontal writing format) and enters the slip into the received order file 16. The received order master file 15 stores the order data. The mail service unit 10 transfers files (i.e., slips) from the received order file 16 to a merchandise delivery center, not shown. The received order file 16 stores the slips. The multimedia console 5 is a terminal located on the side of the center and allows merchandise information to be entered into the server of the center.

Figure 4:
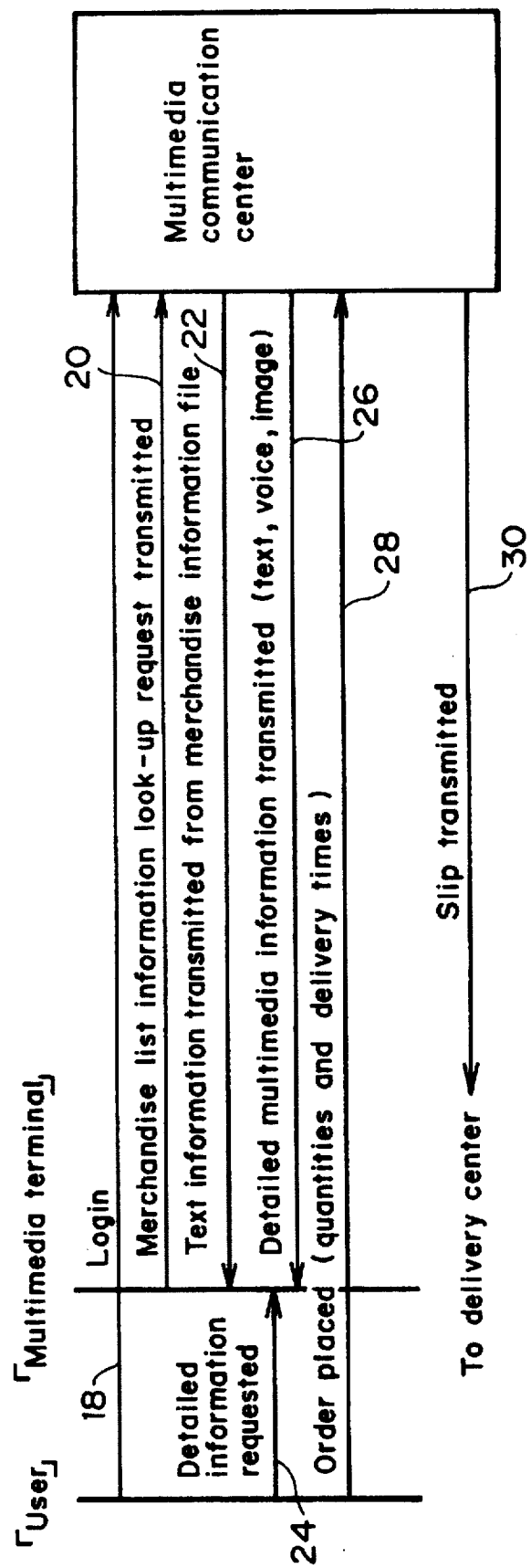
FIG. 4 is an operation sequence diagram explaining how the first embodiment operates.

Described below with reference to FIG. 4 is how the first embodiment operates to permit execution of merchandise ordering and delivering services. First, as indicated by reference numeral 18 in FIG. 4, a user calls the center from the multimedia terminal 1 to log in. Then as indicated by reference numeral 20 in FIG. 4, the multimedia terminal 1 outputs a look-up request for merchandise list information. With the merchandise information look-up request received by the multimedia communication control unit 7, the bulletin board service unit 8 sends text information 11 from the merchandise information unit 14 to the multimedia terminal 1 as indicated by reference numeral 22 in FIG. 4.

Then as indicated by reference numeral 24 in FIG. 4, the user enters a detailed information request into the multimedia terminal 1. The information request is sent to the multimedia communication control unit 7 as indicated by reference numeral 25 in FIG. 3. In response, the bulletin board service unit 8 retrieves multimedia information including text information 11, image information 12 and voice information 13 from the merchandise information unit 14, and transmits the retrieved information to the multimedia terminal 1, as indicated by reference numeral 26.

At this point, the user recognizes the multimedia information and places an order as indicated by reference numeral 28 in FIGS. 3 and 4. The order includes the quantities and delivery times of desired merchandise. Given the order, the ordering service unit 9 stores the ordered merchandise into the received order master file 15. The stored information on the ordered merchandise is transcribed onto a ruled slip by the ordering service unit 9. The slip is then stored in the received order file 16. The address, name and user code number of the user who placed the order, all recognized upon entry of the ordered merchandise into the received order master file 15, are stored along with the slip into the received order file 16. The slip thus held in the received order file 16 is transferred to the merchandise delivery center via the mail service unit 10 as indicated by reference numeral 30.

In short, with the above multimedia communication system practiced as the first embodiment, the multimedia server 6 in the multimedia communication center keeps overall control on multimedia information edited into menu format for display on the user's multimedia terminal 1 for efficient selection of information. The selected item or items in the menu are supplemented by the telephone number of the ordering terminal (i.e., multimedia terminal 1), the selection number or numbers, and a time stamp and a timing in effect when the service is utilized. With the multimedia terminal 1 connected to the multimedia communication center via a telephone line, the user can acquire in real time multimedia information on merchandise including photographs, text, voice and images through the terminal that may be a fax machine, a video display terminal or a telephone set, or any combination of these machines. There is no need for the user to receive mailed merchandise information such as pamphlets from the center.

A multimedia communication system practiced as the second embodiment of the invention will now be described with reference to FIG. 5. The multimedia communication system of FIG. 5 permits execution of merchandise ordering and delivering services in a setup involving a plurality of multimedia information providers dispersed at remote locations.

Figure 5:
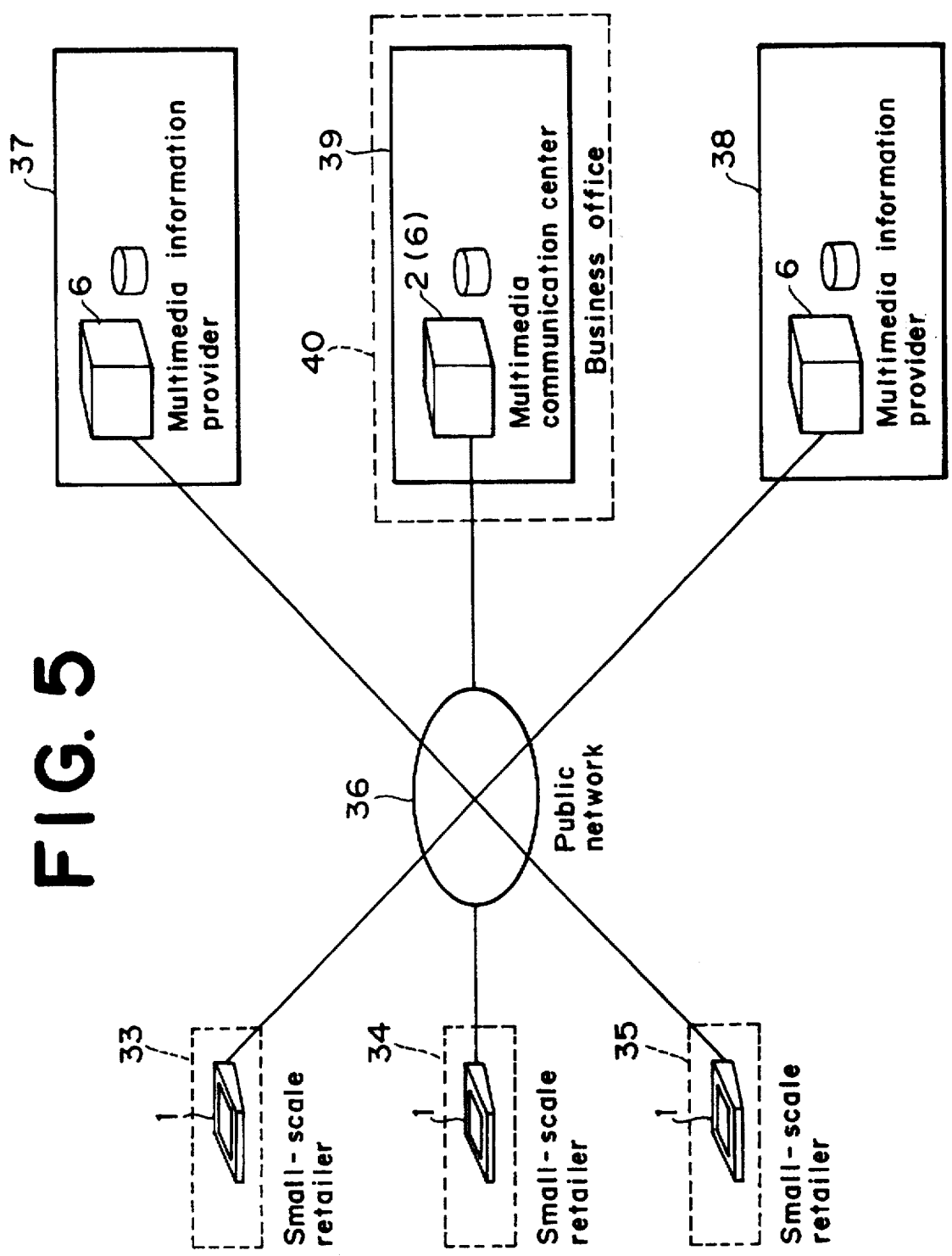
FIG. 5 is a schematic block diagram of a multimedia communication system practiced as a second embodiment of the invention.

In FIG. 5, reference numerals 33, 34 and 35 denote small-scale retailers each having a multimedia terminal 1 installed at the site thereof (terminal 1 was discussed in connection with the first embodiment). Reference numeral 36 represents a public network. A plurality of multimedia information providers 37 and 38 are dispersed at remote locations. A multimedia communication center 39 doubles as a multimedia information provider and is established at the site of a business office 40. The multimedia information providers 37 and 38 are each furnished with a multimedia server 6 (discussed in conjunction with the first embodiment). A host computer 2 including the multimedia server 6 is installed at the multimedia communication center 39.

The host computer 2 of the multimedia communication center 39 has a function which receives a request for a new merchandise information service from the multimedia terminal 1 of any one of the small-scale retailers 33 through 35, and which in turn sends back to the terminal 1 new merchandise information items supplemented with two numbers: the telephone number of the multimedia server 6 at the multimedia information provider 37 or 38 capable of providing the new merchandise information service, and an information request number corresponding to the new merchandise. At the multimedia information provider 37 or 38, the multimedia terminal 1 has a function which, given an entry of the designated information request number corresponding to the new merchandise, automatically dials the telephone number of the multimedia information provider 37 or 38 corresponding to the designated number.

Figure 6:
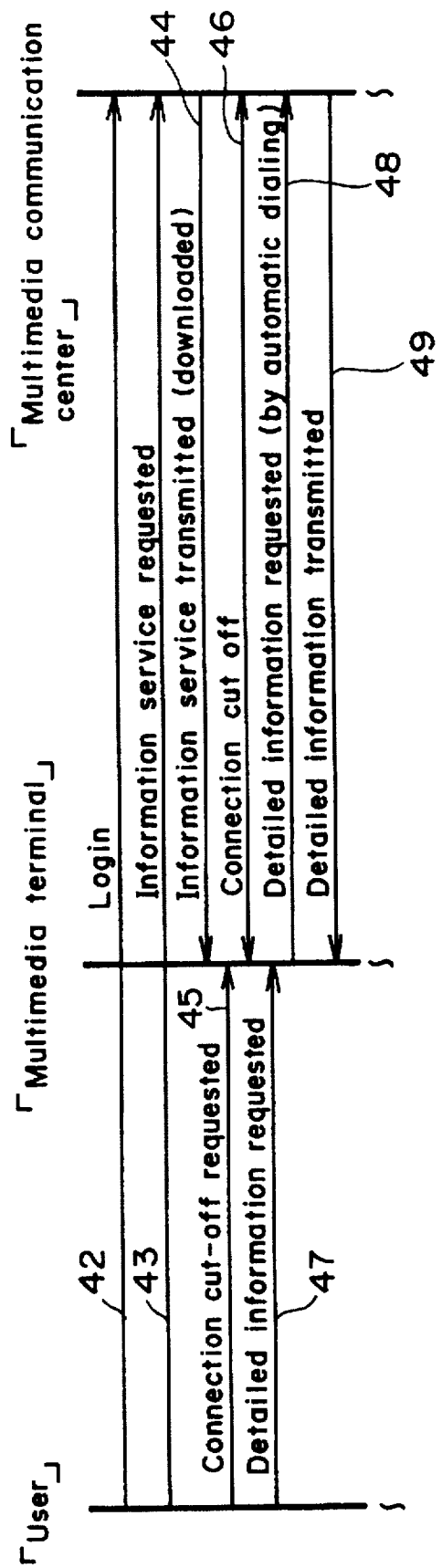
FIG. 6 is an operation sequence diagram explaining how the second embodiment operates.

Described below with reference to FIG. 6 is how the second embodiment operates to permit execution of merchandise ordering and delivering services. Initially, as indicated by reference numeral 42, a user calls up the center 39 from the multimedia terminal 1 to log in. Then as indicated by reference numeral 43, the user sends an information service request from the multimedia terminal 1 to the center 39. In response, the center 39 sends back to the multimedia terminal 1, as indicated by reference numeral 44, new merchandise information items supplemented with two numbers: the telephone number of the multimedia server 6 of the multimedia information provider 37 or 38 capable of providing the new merchandise information service corresponding to the received request, and an information request number corresponding to the new merchandise. The multimedia terminal 1 downloads the returned information.

Following the downloading, the user requests the multimedia terminal 1 to cut off the line connection for the moment, as indicated by reference numeral 45. Given the request from the terminal 1, the center 39 cuts off the connection as indicated by reference numeral 46. With the line disconnected, the user looks up the merchandise list in the downloaded information and makes a detailed information request, as indicated by reference numeral 47. The detailed information request is issued by selecting and designating the information request number corresponding to the new merchandise. With the information request number designated, the telephone number corresponding to that request number is automatically dialed. The call connects the terminal 1 to the multimedia information provider 37 or 38 to put the detailed information request through to the provider, as indicated by reference numeral 48. Specifically, a detailed information request number is transferred by the request to the information provider.

Upon receipt of the detailed information request number, the multimedia information provider 37 or 38 accordingly searches through its database (i.e., merchandise information unit 14), retrieves the detailed merchandise information requested, and transmits the retrieved information to the multimedia terminal 1 that issued the request, as indicated by reference numeral 49. The user at the multimedia terminal 1 then places an order of the merchandise on the basis of the detailed information by following the same steps as those of the first embodiment described with reference to FIG. 4.

The above-described series of steps for automatically reestablishing the connection following the cut-off, for issuing the detailed information request to the multimedia information provider 37 or 38, and for getting the information provider to return the relevant detailed information may be taken over by a media switching system proposed in Japanese Patent Application No. H04-111091. The proposed media switching system allows the above series of steps to be carried out without disconnecting the call halfway, and the communication fees resulting from these steps are all charged to the user's account.

The media switching system is a system that allows different media to be switched without terminating the current call. Briefly, the system works as follows: A first modem between a user's terminal and a telephone exchange switches a personal computer, a fax terminal or a telephone set of the user to the telephone exchange; and a second modem of a host computer switches a data communication control unit or a fax/voice communication control unit in the computer to the telephone exchange. The switching operation of the second modem is controlled by a media switching control unit. A personal computer communication control unit starts up the media switching control unit at the start of data communication. A command for switching from data communication to image communication causes the fax terminal and the fax/voice communication control unit to be selected to effect voice communication. A command for switching to the fax communication protocol causes the personal computer and the data communication control unit to be selected to effect data communication.

The above-described multimedia communication system practiced as the second embodiment integrates a plurality of information providers dispersed at remote locations as well as the multimedia communication center. A multimedia terminal 1 downloads menu information from the center, searches through the downloaded information on an off-line basis, and subsequently places an order for necessary information. This reduces the communication fees on the part of the terminal for connection to the center. Alternatively, the terminal 1 may place an order on-line. Following the search through the downloaded information, the user may select the item of a multimedia information transmission request. This causes the relevant multimedia information provider to be automatically called up, whereby the dialing procedure is simplified.

Figure 7:
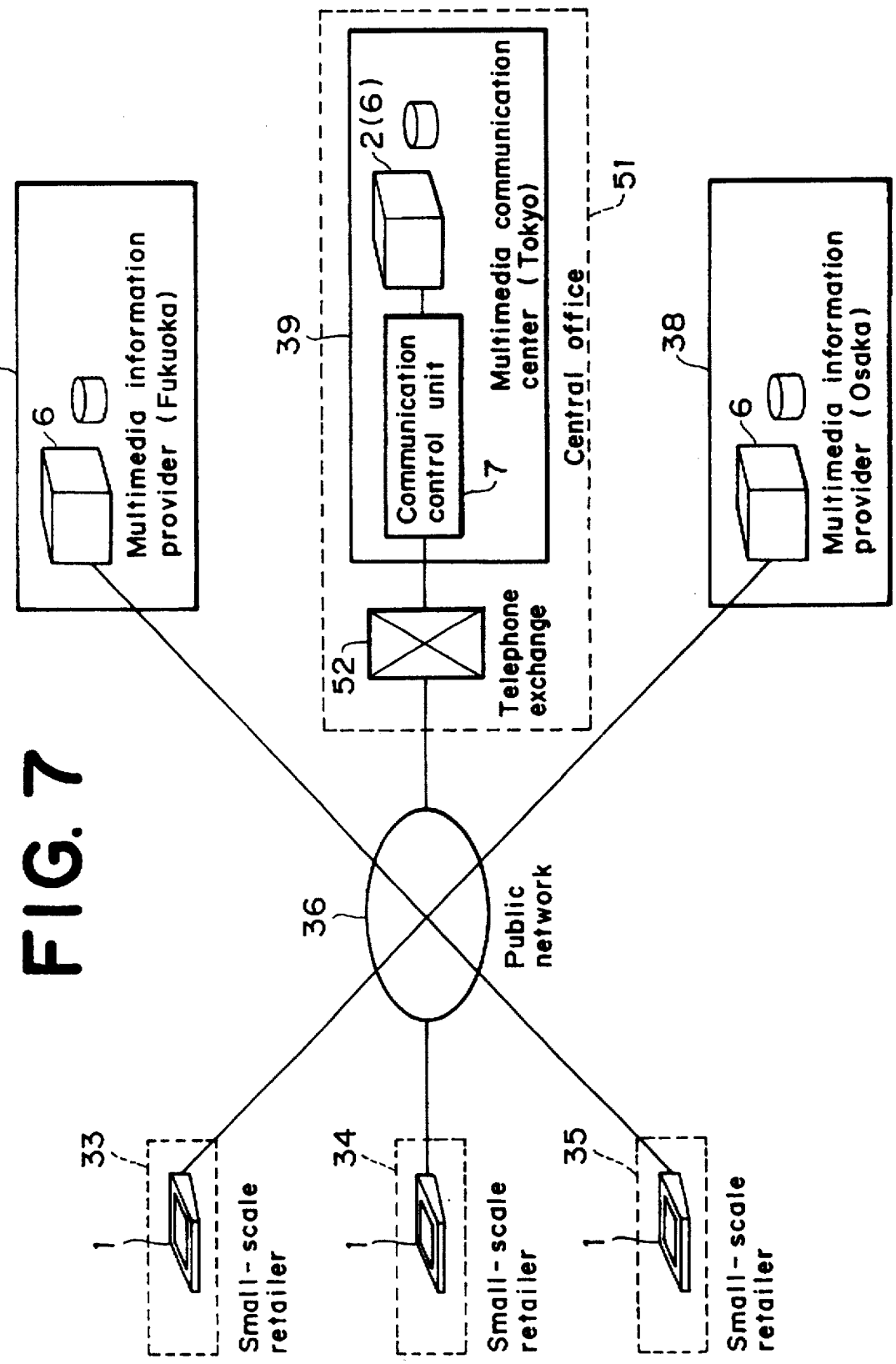
FIG. 7 is a schematic block diagram of a multimedia communication system practiced as a third embodiment of the invention.

Another multimedia communication system practiced as the third embodiment of the invention will now be described with reference to FIGS. 7 and 8. Of the parts in FIG. 7, those already shown in FIG. 5 in connection with the second embodiment are represented by like reference numerals. Whereas the second embodiment in FIG. 5 has the multimedia communication center located at a business office, the third embodiment in FIG. 7 has a multimedia communication center 39 located close to a telephone exchange 52 of a Tokyo central office 51. The telephone exchange 52 operates in conjunction with the multimedia server 6 of the multimedia communication center 39. A multimedia information provider 37 is located in Fukuoka, and another multimedia information provider 38 in Osaka.

Although the same information as that discussed in connection with the second embodiment is stored in the multimedia server 6 of the multimedia communication center 39 in FIG. 7, steps are different for requesting from the multimedia terminal 1 the downloading of an information providing service. initially, a user at a terminal 1 accesses the center 39 to log in, as indicated by reference numeral 55 in FIG. 8. With the call put through, the user issues an information service request to the center 39 as indicated by reference numeral 56. At this point, information called a "download request/detailed information transmission request" is transmitted after being set for "download requested."

The multimedia communication center 39 identifies the transmitted information, and sends a new merchandise information list of the information providing service to the terminal 1, as indicated by reference numeral 57. In this case, as opposed to the second embodiment, new merchandise items are not supplemented by the telephone number of the multimedia server 6 of any information provider. The telephone number information consists of the telephone number of the multimedia communication center 39 alone. This means that compared with the second embodiment, the third embodiment entails a reduced amount of telephone number data about the multimedia servers 6 of information providers with respect to new merchandise items. The reduced data quantity translates into a shortened download time resulting in lowered communication fees.

Figure 8:
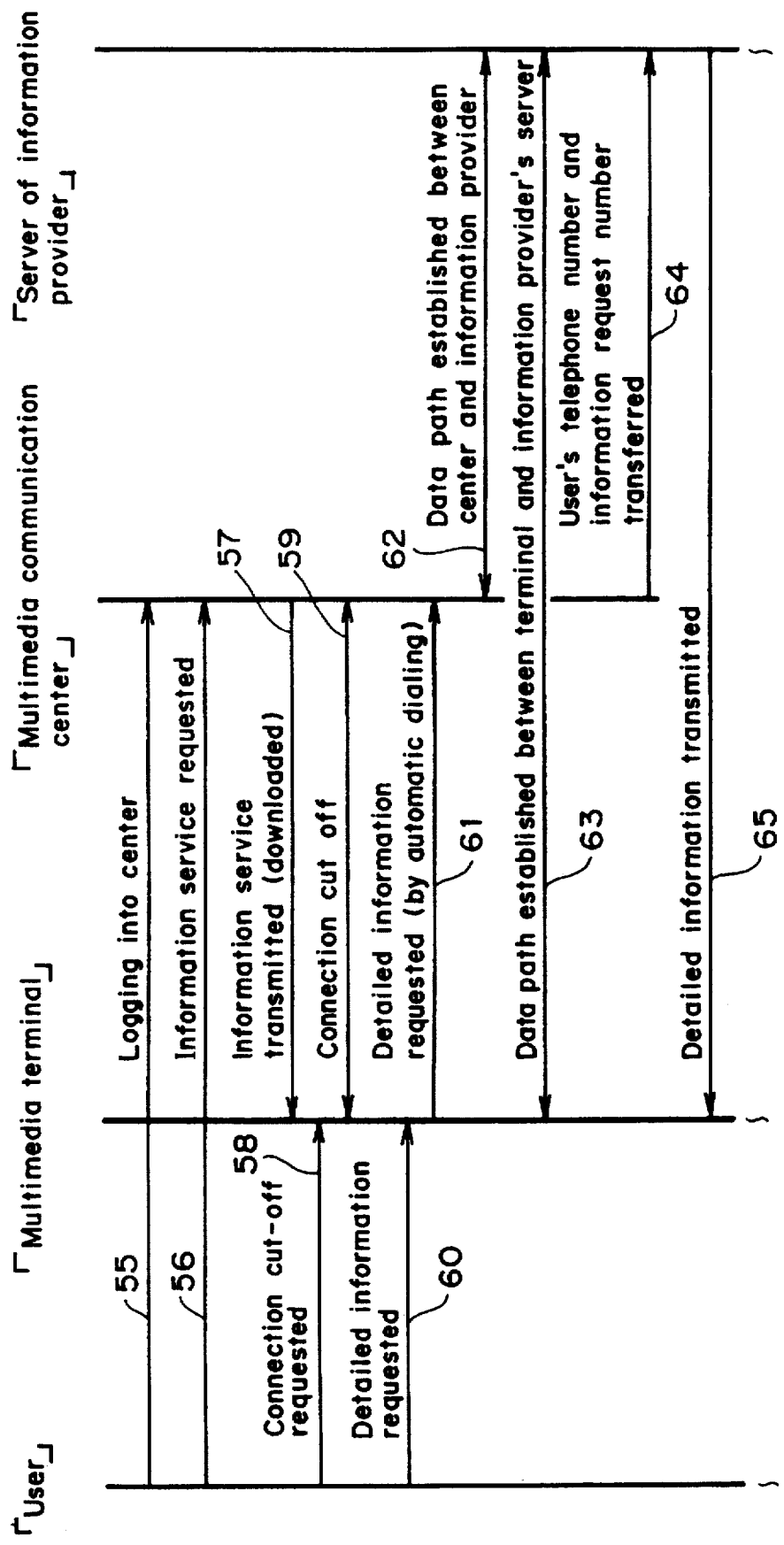
FIG. 8 is an operation sequence diagram explaining how the third embodiment operates.

Then as indicated by reference numeral 58 in FIG. 8, the user requests the cut-off of the connection between the multimedia terminal 1 and the multimedia communication center 39. In response, the connection between the terminal 1 and the center 39 is cut off as indicated by reference numeral 59. As with the second embodiment, the user then searches through the downloaded merchandise list and selects what is desired, as indicated by reference numeral 60. With the selection made, the third embodiment unlike the second embodiment causes the center 39 to be called automatically as indicated by reference numeral 61.

When the call is put through, the terminal 1 illustratively sets the "download request/detailed information transmission request" information for "detailed information requested" and transmits the relevant detailed information request number to the center. In turn, the multimedia server 6 of the center 39 identifies the "download request/detailed information transmission request" information, searches through the database on the basis of the detailed information request number transmitted, and retrieves the telephone number of the multimedia server 6 located at the relevant multimedia information provider.

In cooperation with the telephone exchange 52, the multimedia communication control unit 7 of the multimedia server 6 at the center 39 provides the following call control: With the data path between the terminal 1 and the center 39 maintained, another data path is established between the multimedia communication center 39 and the multimedia server 6 of the information provider as indicated by reference numeral 62 in FIG. 8, under control of the multimedia communication control unit 7. Then another data path is established directly between the terminal 1 and the multimedia server 6 of the multimedia information provider 37 or 38 as indicated by reference numeral 63.

After the data path identified by reference numeral 63 is established, the center 39 transfers the telephone number of the terminal 1 and the multimedia information request number to the multimedia server 6 of the multimedia information provider 37 or 38, as indicated by reference numeral 64. In response, the relevant detailed information is transmitted to the multimedia terminal 1 as indicated by reference numeral 65. The subsequent steps are the same as those discussed in connection with the second embodiment.

The third embodiment described above allows the terminal 1 to receive the detailed information list after making a download request. Alternatively, a new merchandise list of the information providing service may be broadcast regularly (e.g., once a week) from the center 39 under timer control to retailers under contract at a time of day when the communication rates are discounted (e.g., at night). This alternative service will eliminate downloading operations at the terminals 1 if implemented.

In short, with the above multimedia communication system practiced as the third embodiment, the multimedia server at the center responds to a detailed information request from any of the multimedia terminals 1, searches through the telephone numbers of a plurality of information providers dispersed at remote locations in order to find the telephone number of the relevant information provider, establishes data paths with respect to the calling terminal as well as to the relevant information provider, transfers the telephone number and the detailed information request number of the user at the calling terminal 1 to the information provider, and allows the information provider to transmit the detailed information to the user's terminal 1. The center may also transmit the latest merchandise list to users' terminals 1 periodically.

Figure 9:
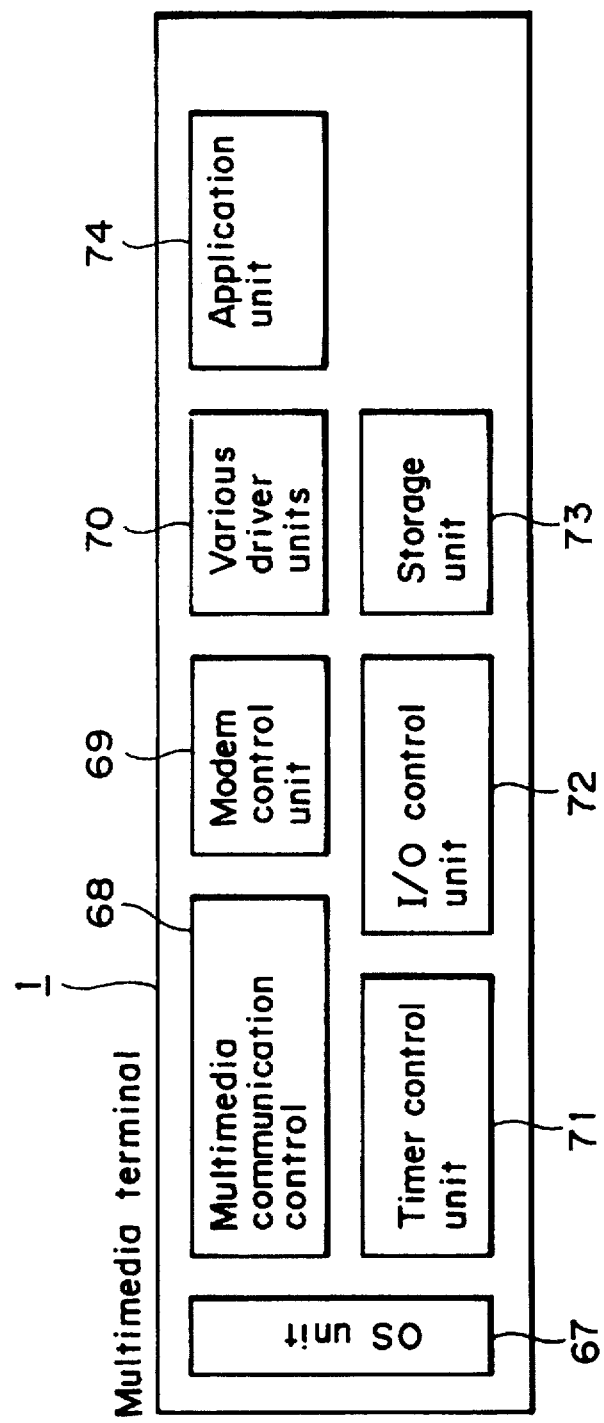
FIG. 9 is a schematic block diagram of a multimedia terminal applicable to the first through the third embodiment of the invention.
Figure 10:
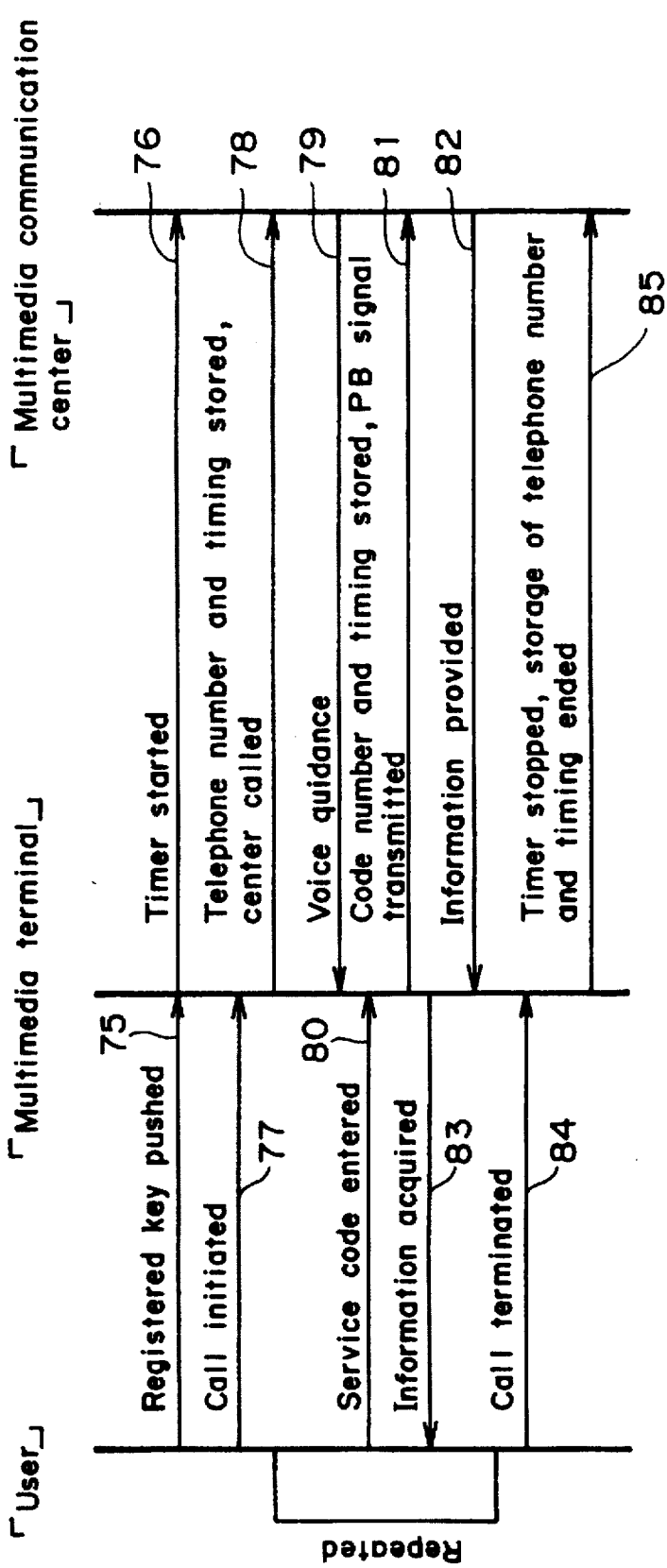
FIG. 10 is an operation sequence diagram explaining how the terminal of FIG. 9 operates.

FIG. 9 is a schematic block diagram of a multimedia terminal 1 applicable to the first through the third embodiment of the invention. FIG. 10 shows an operation sequence diagram explaining how the terminal of FIG. 9 operates. The multimedia terminal 1 of FIG. 9 comprises an OS unit 67, a multimedia communication control unit 68, a modem control unit 69, various driver units 70 such as a floppy disc driver, a timer control unit 71, an I/O control unit 72, a storage unit 73, and an application unit 74 composed of communication software and the like.

As indicated by reference numeral 75 in FIG. 10, a user at the multimedia terminal 1 first presses a registered key, not shown, to go off-hook. This starts the timer of the timer control unit 71 as indicated by reference numeral 76. The user then gets the terminal 1 to call up the multimedia communication center as indicated by reference numeral 77. The time required to link up with the center is measured, and the measured time and the telephone number being dialed are stored concurrently into the storage unit 73, as indicated by reference numeral 78.

With the call put through to the center, a voice guidance is transmitted from the center to the terminal 1 as indicated by reference numeral 79. The user enters a service code according to the guidance, as indicated by reference numeral 80. The entry of the service code causes both a number derived from the code and the transmission timing to be stored into the storage unit 73, and the service code is transmitted as a PB signal to the center, as indicated by reference numeral 81. Upon receipt of the transmitted PB signal, the center supplies the terminal 1 with the information corresponding to the PB signal as indicated by reference numeral 82. The user then obtains necessary information, as indicated by reference numeral 83. Thereafter, the user terminates the call (by going on-hook) as indicated by reference numeral 84. This stops the timer of the timer control unit 71 and ends the storing of the telephone number, PB signal number and transmission timing, as indicated by reference numeral 85.

The steps above are repeated until the user goes on-hook. After the operation, the storage unit retains key information supplemented by the transmission timing. If the process is desired to be repeated, simply pressing a redialing key transmits again the key information to the center in the appropriate timing. In addition, the timing-furnished key information may be edited on the screen on the basis of the previously stored information. This makes it possible easily to register new sequences similar to the preceding processes. Given such resources, the user may carry out concurrent and advance command input with a simple push of a button.

As described, the multimedia communication system according to the invention allows a user at a terminal to place an order of merchandise efficiently with the multimedia server of an information provider and permits the relevant merchandise provider to deliver the ordered merchandise efficiently to the user.

As many apparently different embodiments of this invention may be made without departing from the spirit and scope thereof, it is to be understood that the invention is not limited to the specific embodiments thereof except as defined in the appended claims.

What is claimed is:

1. A multimedia communication system comprising:

terminals;

a multimedia server for sending to each of said terminals, when called up thereby, multimedia information including photographs, text, voice and images regarding merchandise; and a public network for connecting said terminals to said multimedia server;

said multimedia server comprising:

information storage means for storing multimedia information on each of merchandise items;

communication control means for controlling the transmission of information between said multimedia server and said terminals via said public network;

bulletin board service means for transmitting said merchandise items from said information storage means to said communication control means upon request for a merchandise information look-up by one of said terminals, said bulletin board service means further transmitting multimedia information from said information storage means to said communication control means in response to a detailed merchandise information request entered by a user through one of said terminals;

ordering service means for receiving via said communication control means quantities and delivery times of merchandise ordered by a user through one of said terminals and for entering what is ordered into a received order master file while transcribing the received quantities and delivery times of merchandise from said received order master file onto a slip, said ordering service means further entering said slip into a received order file after adding to said slip an address, name and user code number of said user who placed the order; and mail service means for transmitting slips held in said received order file to the terminal of a merchandise delivery center via said communication control means;

wherein:

a plurality of units of said multimedia server are installed at a plurality of information providers dispersed at remote locations;

the multimedia server of a principal information provider integrating the other information providers has means for transmitting to one of said terminals said merchandise items of multimedia information supplemented with the telephone number of one of the remotely located information providers and the information request number corresponding to each merchandise item, the remotely located information provider being a provider capable of offering the multimedia information corresponding to the merchandise information look-up request sent from the terminal in question; and each of said terminals has means for automatically dialing the telephone number of the remotely located information provider corresponding to said information request number.

2. A multimedia communication system according to claim 1, wherein the automatic dialing by one of said terminals takes place when the multimedia server of said principal information provider is off-line.

3. A multimedia communication system according to claim 1, wherein the automatic dialing by one of said terminals takes place when the multimedia server of said principal information provider is on-line.

4. A multimedia communication system comprising:

terminals;

a multimedia server for sending to each of said terminals, when called up thereby, multimedia information including photographs, text, voice and images regarding merchandise; and a public network for connecting said terminals to said multimedia server;

said multimedia server comprising:

information storage means for storing multimedia information on each of merchandise items;

communication control means for controlling the transmission of information between said multimedia server and said terminals via said public network;

bulletin board service means for transmitting said merchandise items from said information storage means to said communication control means upon request for a merchandise information look-up by one of said terminals, said bulletin board service means further transmitting multimedia information from said information storage means to said communication control means in response to a detailed merchandise information request entered by a user through one of said terminals;

ordering service means for receiving via said communication control means quantities and delivery times of merchandise ordered by a user through one of said terminals and for entering what is ordered into a received order master file while transcribing the received quantities and delivery times of merchandise from said received order master file onto a slip, said ordering service means further entering said slip into a received order file after adding to said slip an address, name and user code number of said user who placed the order; and mail service means for transmitting slips held in said ordering service means to the terminal of a merchandise delivery center via said communication control means, wherein a plurality of units of said multimedia server are installed at a plurality of information providers dispersed at remote locations; and wherein the multimedia server of a principal information provider integrating the other information providers and linking up with a telephone exchange of said public network includes:

means for receiving a merchandise-specific information request number sent from one of said terminals;

means for dialing in response to the telephone number of the multimedia server at the information provider capable of providing multimedia information to the terminal having sent the information request number;

means for transmitting to the connected multimedia server the telephone number of said terminal and said information request number; and means for transmitting to said terminal the merchandise items of multimedia information supplemented with the telephone number of the multimedia server at said principal information provider;

wherein each of said terminals has means for automatically dialing a telephone number of said principal information provider; and wherein each of the multimedia servers installed at the remotely located information providers has means for transmitting multimedia information to one of said terminals in accordance with the telephone number of the terminal in question and with said information request number, the two numbers having being sent from the multimedia server of said principal information provider.

5. A multimedia communication system according to claim 1, wherein the multimedia server of said principal information provider has a function for automatically transmitting to said terminals, at a predetermined time, said merchandise items of multimedia information supplemented with the telephone number of one of the remotely located information providers and the information request number corresponding to each merchandise item, the remotely located information provider being a provider capable of offering said multimedia information.

6. A multimedia communication system according to claim 5, wherein each of said terminals has a function for altering said predetermined time for the automatic transmission as desired.

7. A multimedia communication system according to claim 1, wherein each of said terminals has a function for storing the telephone number being dialed and the transmission timing regarding said telephone number, and for transmitting the stored telephone number using said transmission timing when said telephone number is redialed.

* * * * *